United States Patent
Wong et al.

(10) Patent No.: US 10,742,756 B2
(45) Date of Patent: *Aug. 11, 2020

(54) RECOMMENDING OBJECTS TO A USER OF A SOCIAL NETWORKING SYSTEM BASED ON IMPLICIT INTERACTIONS BETWEEN THE USER AND THE RECOMMENDED OBJECTS

(71) Applicant: Facebook, Inc., Menlo Park, CA (US)

(72) Inventors: James Wah Hou Wong, San Francisco, CA (US); Ashish Kumar Yadav, Mountain View, CA (US); Jinyi Yao, Issaquah, WA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 15/657,017

(22) Filed: Jul. 21, 2017

(65) Prior Publication Data

US 2017/0324820 A1 Nov. 9, 2017

Related U.S. Application Data

(63) Continuation of application No. 14/453,080, filed on Aug. 6, 2014, now Pat. No. 9,729,648.

(51) Int. Cl.
*G06Q 50/00* (2012.01)
*H04L 29/08* (2006.01)

(52) U.S. Cl.
CPC ........... *H04L 67/22* (2013.01); *G06Q 50/01* (2013.01); *H04L 67/306* (2013.01)

(58) Field of Classification Search
None
See application file for complete search history.

(56) References Cited

U.S. PATENT DOCUMENTS

| 2013/0124449 A1* | 5/2013 | Pinckney | G06N 5/048 706/52 |
| 2014/0019539 A1* | 1/2014 | Novak | G06Q 30/0201 709/204 |
| 2014/0207860 A1* | 7/2014 | Wang | H04L 65/403 709/204 |

(Continued)

OTHER PUBLICATIONS

United States Office Action, U.S. Appl. No. 14/453,080, dated Oct. 6, 2016, seven pages.

*Primary Examiner* — Paulinho E Smith
(74) *Attorney, Agent, or Firm* — Fenwick & West LLP (57) ABSTRACT

The social networking system monitors implicit interactions between a user and objects of the social networking system with which the user has not established a connection. Based on the implicit interactions between the user and an object, the social networking system identifies a soft connection between the user and the object. The social networking system may then identify soft connections to include in a candidate list of soft connections to recommend to the user. The social networking system may also extract signals from the set of candidate list of soft connections, and may use the extracted signals to rank the soft connections in the list of candidate soft connections. The social networking system may then recommend soft connections to the user based on the rank associated with the soft connections in the candidate list of soft connections.

20 Claims, 3 Drawing Sheets

(56) References Cited

U.S. PATENT DOCUMENTS

2015/0046528 A1* 2/2015 Piepgrass .......... G06F 15/17306
709/204
2016/0042279 A1* 2/2016 Wong .................... H04L 67/306
706/46

* cited by examiner

RECOMMENDING OBJECTS TO A USER OF A SOCIAL NETWORKING SYSTEM BASED ON IMPLICIT INTERACTIONS BETWEEN THE USER AND THE RECOMMENDED OBJECTS

CROSS REFERENCE TO RELATED APPLICATIONS

This application is a continuation of U.S. application Ser. No. 14/453,080, filed Aug. 6, 2014, which is incorporated by reference in its entirety.

BACKGROUND

This invention generally relates to social networking systems, and more particularly to recommending objects, such as pages, to new users of the social networking system.

A social networking system allows its users to connect to and communicate with other social networking system users. Users may create profiles on a social networking system that are tied to their identities and include information about the users, such as interests and demographic information. In addition, a user on a social networking system interacts with various entities on the social networking system, including other users, objects (e.g., pages for businesses, content items posted on the social networking system, etc.), and so develops a history of interacting with entities. The social networking system may monitor the interactions of a user with objects with which the user has established a connection, such as interactions between a user and another user, where the user has established a connection with the other user by adding the other user as a friend. The social networking system may recommend objects to the user based on the interactions between the user and objects with which the user has established a connection. However, for users new to the social networking system or with little or very few established connections, the social networking system is often unable to generate accurate recommendations of objects to provide to the users.

SUMMARY

The social networking system recommends objects, such as pages (e.g., pages representing businesses, brands, or organizations to which users can connect by, for example, "liking" the page), of the social networking system to users of the social networking system based on implicit interactions between the users and objects of the social networking system. Implicit interactions are those actions taken by a user with respect to an object of the social networking system that does not involve the creation of an established connection between the user and the object, or is not associated with an object with which the user has established a connection. Examples of implicit interactions include visiting a page or user profile with which the user has not established a connection, searching for a "hashtag" the user has not produced or created, or interacting with content of a page, such as "liking" a post on the page but not establishing a connection with the page by "fanning" the page. This allows the social networking system to provide recommendations to users, such as new users or users with very few established connections to objects of the social networking system. Implicit interactions are different from explicit interactions, as explicit interactions are those interactions associated with an established connection between an object and the user. For example, sending a message to a friend of the user or liking a comment posted by a friend of the user are interactions of the user associated with an established connection between an object and the user, since in this case the user has established a connection with another user of the social networking system thereby making them friends on the social networking system.

The social networking system monitors implicit interactions between the user and objects of the social networking system with which the user has not established a connection, such as when a user browses a page the user has not "fanned." Based on the implicit interactions between the user and an object, the social networking system identifies a soft connection between the user and the object. The social networking system may identify a soft connection in a number of ways, for example based on the number of implicit interactions between the user and the object in a given time interval. The social networking system may then identify soft connections to include in a candidate list of soft connections to recommend to the user. The soft connections in the candidate list of soft connections represent strong soft connections that are relevant to recommend to a user.

In one example, the social networking system may identify additional objects to include in the list of soft connections to recommend to the user. For example, the social networking system may identify objects similar to those identified by the soft connections in the candidate list of soft connections to recommend to the user. The social networking system may also extract signals from the set of candidate list of soft connections, and may use the extracted signals to rank the soft connections in the list of candidate soft connections. The social networking system may then recommend objects identified by soft connections in the candidate list of soft connections to the user based on the rank associated with the soft connections in the candidate list of soft connections.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
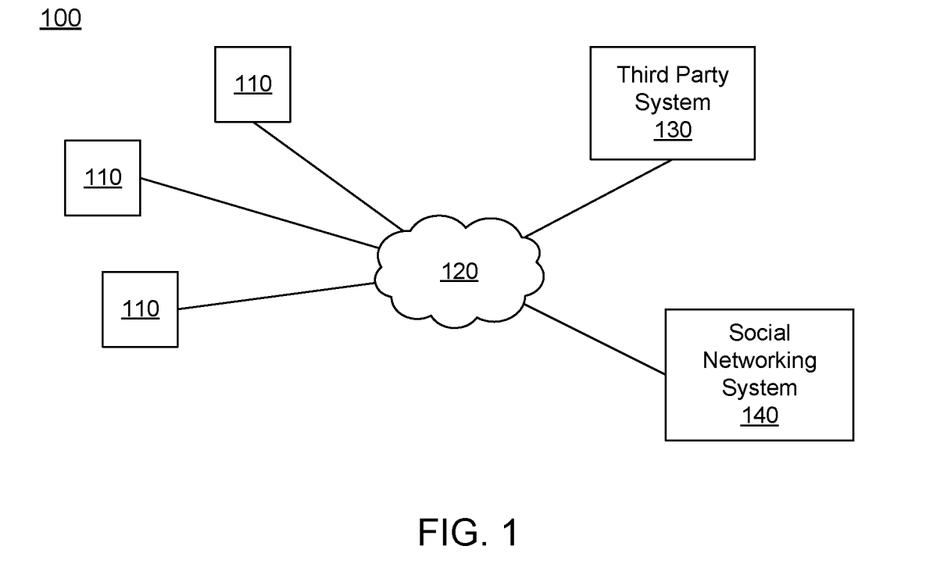
FIG. 1 is a block diagram of a system environment in which a social networking system operates, according to one embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
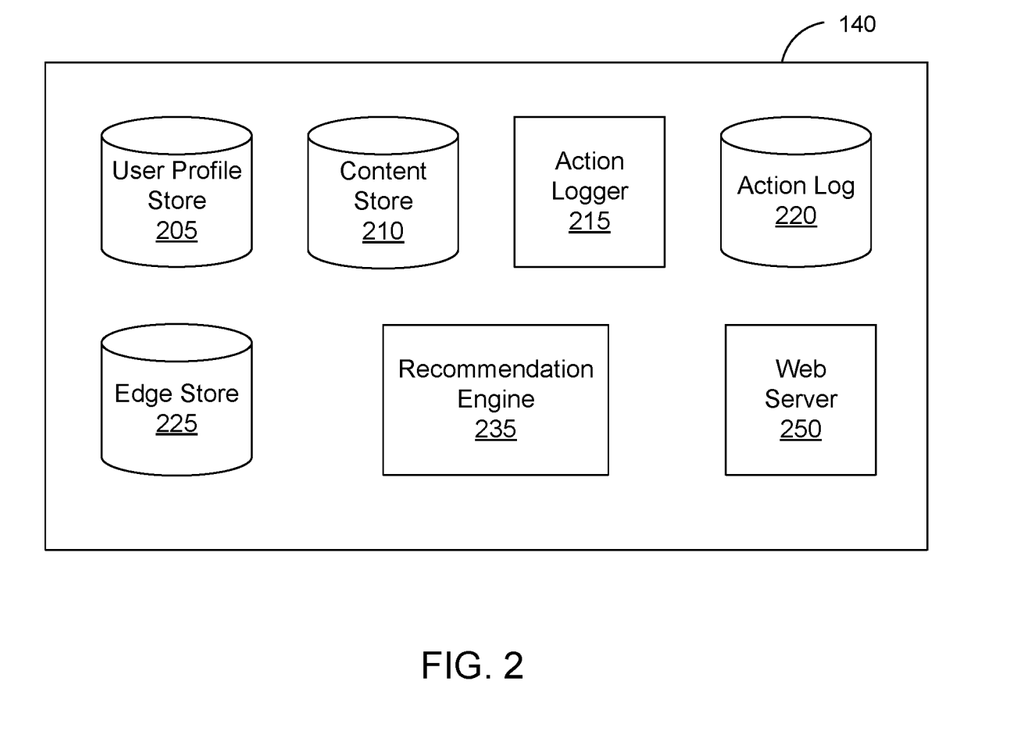
FIG. 2 is a block diagram of a social networking system, according to one embodiment.

FIG. 2 is an example block diagram of an architecture of the social networking system 140. The social networking system 140 shown in FIG. 2 includes a user profile store 205, a content store 210, an action logger 215, an action log 220, an edge store 225, a recommendation engine 235 and a web server 265. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, an event page, or any other type of content. Thus, the brand page described above can be an object within the social networking system. Social networking system users may create objects stored by the content store 210, such as status updates, photos tagged by users to be associated with other objects in the social networking system, events, groups, applications or pages representing an individual, group or business. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, showing interest in pages by "fanning" or "liking" the pages and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

In one example, the action log 220 records information identifying whether an interaction associated with the user is an explicit or implicit interaction. Explicit interactions are those interactions associated with an established connection between an object and the user or those interactions creating an established connection between an object and the user. For example, sending a message to a friend of the user or liking a comment posted by a friend of the user are interactions of the user associated with an established connection between an object and the user, since in this case the user has established a connection with another user of the social networking system 140 thereby making them friends on the social networking system 140. In another example, the user "fans" a page thereby creating an established connection between the user and the page. Implicit interactions are those actions taken by a user with respect to an object of the social networking system 140 that does not involve the creation of an established connection between the user and the object, or is not associated with an object with which the user has established a connection. Examples of implicit interactions include visiting a page or user profile with which the user has not established a connection, searching for a "hashtag" the user has not produced or created, or interacting with content of a page, such as "liking" a post on the page but not establishing a connection with the page by "fanning" the page.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Using data from the user profile store 205 and the action log 220, the recommendation engine 235 identifies one or more objects to recommend to a user of the social networking system 140. The recommendation engine 235 identifies soft connections between objects of the social network system 140 and a user based on implicit interactions between the user and the objects of the social networking system 140, as described in conjunction with FIG. 4 below. In one embodiment, the recommendation engine 235 retrieves information identifying implicit interactions between the user and objects of the social networking system 140 from the action log 220. The recommendation engine 235 identifies a set of soft connections to include in a candidate list of soft connections to recommend to the needy user. In one embodiment, the recommendation engine 235 identifies additional objects of the social networking system to include in the candidate list of soft connections based on characteristics associated with the soft connections, as described in conjunction with FIG. 4 below. The recommendation engine 235 may also extract signals from the set of candidate list of soft connections, and may use the extracted signals to rank the soft connections in the list of candidate soft connections. The recommendation engine 235 may then recommend soft connections to the user based on the rank associated with the soft connections in the candidate list of soft connections.

The web server 250 links the social networking system 140 via the network 120 to the one or more client devices 110, as well as to the one or more third party systems 130. The web server 140 serves web pages, as well as other web-related content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Overview of Recommending Objects to a User Based on Soft Connections

Figure 3:
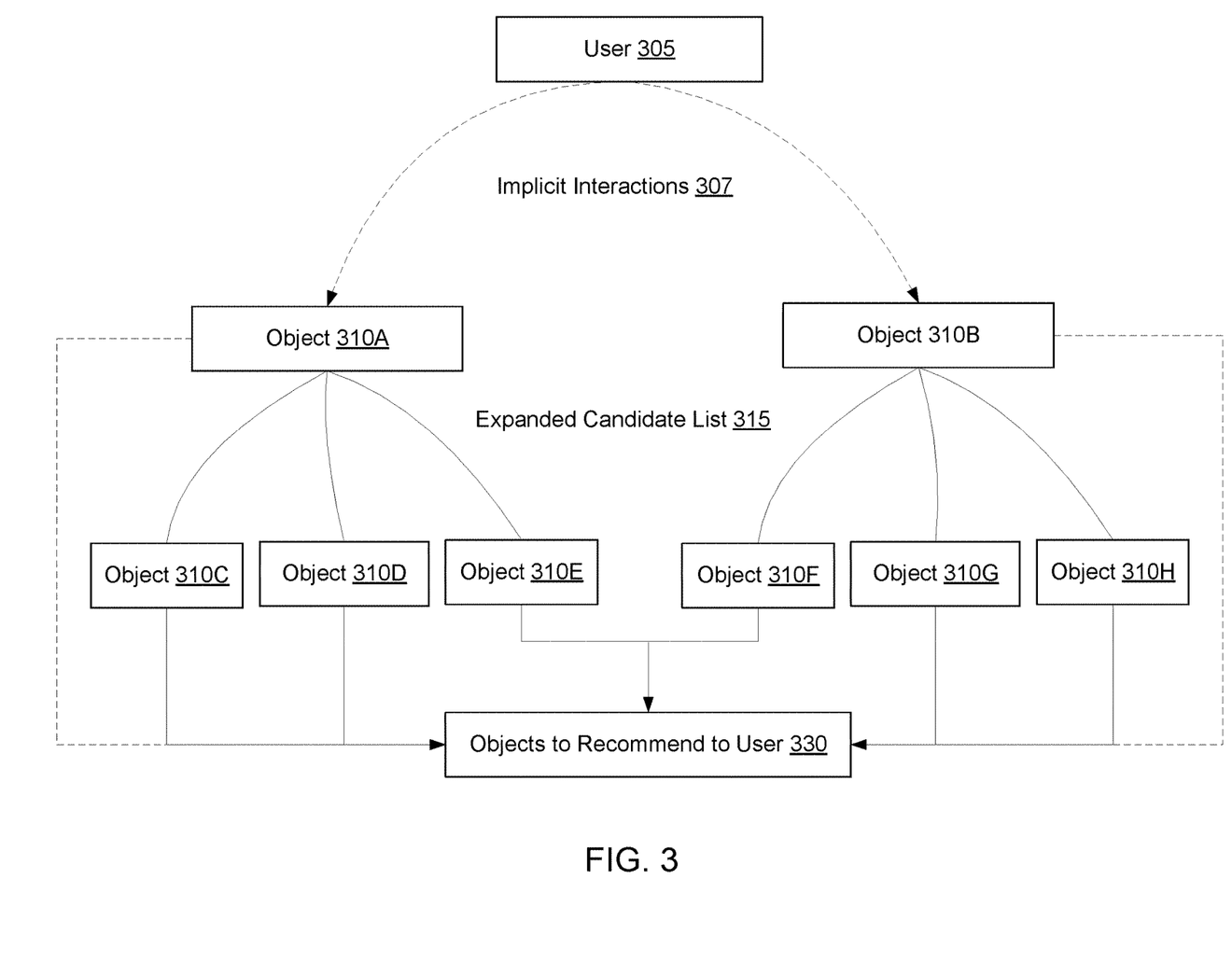
FIG. 3 illustrates an overview of recommending objects to a user of the social networking system based on soft connections, according to one embodiment.

FIG. 3 illustrates an overview of recommending objects to a user of the social networking system based on soft connections, according to one embodiment. The social networking system 140 identifies objects to recommend to a user, such as a needy user 305, based on the implicit interactions 307 between the user and one or more objects of the social networking system 140. A needy user is a user who is in need of suggestions of objects of the social networking system with which the user may be interested in interacting. New users, users with very few established connections, or users who don't often use or interact with objects on the social networking system 140 are examples of needy users. The social networking system 140, based on information in the action log 220 retrieves implicit interactions 307 associated with the needy user 305. Based on the implicit interactions 307 associated with the needy user 305, the social networking system identifies soft connections associated with the user 305, as described in conjunction with FIG. 4 below.

In this example, the social networking system 140 identifies objects 310A and 310B as soft connections connected to the needy user 305. In one embodiment, the social networking system 140 selects objects 310A and 310B as objects to recommend to the user 330, for the user to establish an explicit connection with for example. In one embodiment, the social networking system 140 identifies additional objects to recommend to the user based on the soft connections associated with the needy user 305, as described in conjunction with FIG. 4 below. In one example, objects 310C, 310D and 310E are objects explicitly connected to object 310A and are similar to object 310A; they are associated with the same topic, for example. In another example, objects 310F. 310G and 310H are explicitly connected to object 310B, and are similar to object 310B; they are all explicitly connected to a user who has established an explicit connection with needy user 305. Objects 310C, 310D, 310E, 310F, 310G, and 310H are merged into an expanded candidate list 317 including objects to recommend to the needy user 305, as described in conjunction with FIG. 4 below.

Recommending Objects to a User

Figure 4:
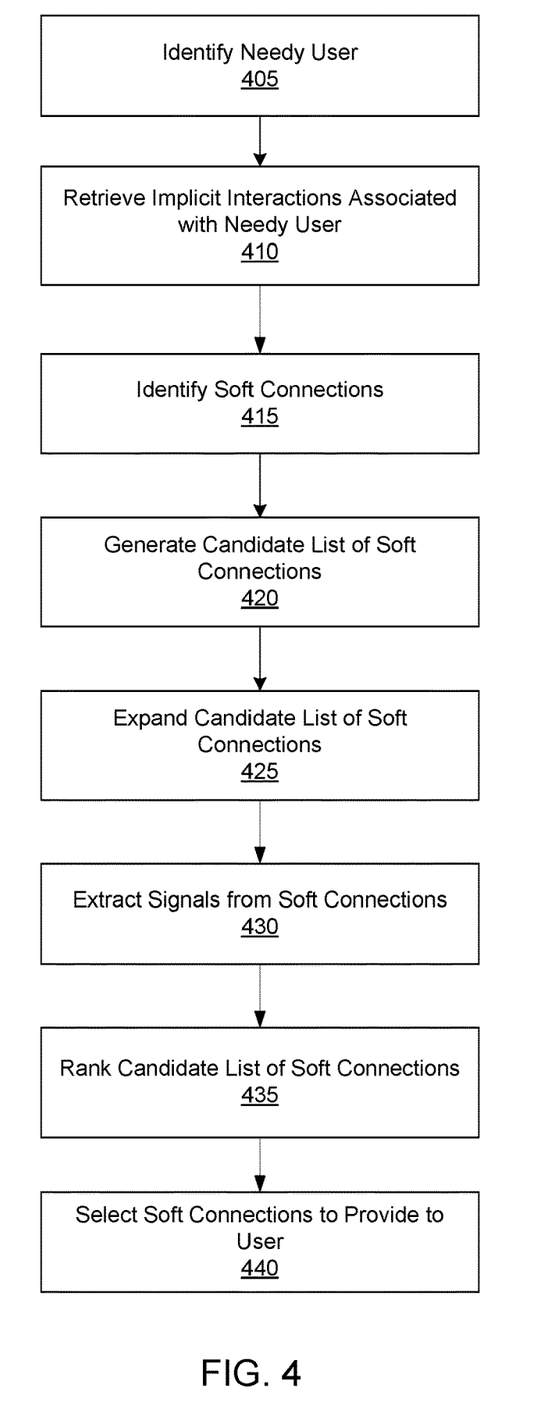
FIG. 4 is a flow chart of a method for recommending objects to a user of a social networking system by identifying soft connections between the user and objects of the social networking system, according to one embodiment.

FIG. 4 is a flow chart of one embodiment of a method for recommending objects to a user of a social networking system by identifying soft connections between the user and objects of the social networking system. In one embodiment, the functionality described in conjunction with FIG. 4 is performed by the recommendation engine 235; however, in other embodiments, any suitable component or combination of components may provide the functionality described in conjunction with FIG. 4. Additionally, in some embodiments, different and/or additional steps than those identified in FIG. 4 may be performed or the steps identified in FIG. 4 may be performed in different orders.

The social networking system 140 identifies 405 a needy user. The social networking system 140 may retrieve information associated with a user profile of the user from the edge store 225 and the action log 220 identifying the type of connections or interactions between the user and different objects of the social networking system 140. For example, the social networking system 140 identifies both explicit and implicit interactions associated with the user. Explicit interactions are those interactions associated with an established connection between an object and the user or those interactions creating an established connection between an object and the user. For example, sending a message to a friend of the user or liking a comment posted by a friend of the user, are interactions of the user associated with an established connection between an object and the user, which in this case the user has established a connection with another user of the social networking system 140 thereby making them friends on the social networking system 140. In another example, the user "fans" a page thereby creating an established connection between the user and the page. Implicit interactions are those actions taken by a user with respect to an object of the social networking system 140 that does not involve the creation of an established connection between the user and the object, or is not associated with an object with which the user has established a connection. Examples of implicit interactions include visiting a page or user profile with which the user has not established a connection, searching for a "hashtag" the user has not produced or created, or interacting with content of a page, such as "liking" a post on the page but not establishing a connection with the page by "fanning" the page.

In one example, the social networking system 140 identifies 405 a user as a needy user if the user has more than a threshold number of implicit interactions, if the user has less than a threshold number of explicit connections or explicit interactions, or if the ratio of the implicit interactions to the explicit interactions is greater than a threshold amount. In another example, the social networking system 140 identifies a user as a needy user based on the number of established connections between the user and objects of the social networking system 140 (e.g., a user with less than a threshold number of established connections is identified as a needy user). In one embodiment, the social networking system 140 identifies a user as a needy user 305 based on whether the user is a new user to the social networking system 140. For example, the social networking system 140 identifies users who have been members of the social networking system 140 for less than a threshold period of time as new users and thus needy users of the social networking system 140.

The social networking system 140 retrieves 410 implicit interactions associated with the needy user using information from the action log 220. In one embodiment, the social networking system 140 retrieves implicit interactions associated with a user and one or more objects with which the user has not established a connection from the action log 220.

Based on the implicit interactions associated with the needy user, the social networking system 140 identifies 415 soft connections associated with the user. In one embodiment, the social networking system 140 identifies 415 soft connections by monitoring multiple types of implicit interactions between the needy user and objects of the social networking system 140. For example, when a user visits a page associated with a business, he is reinforcing a connection to the business. The social networking system 140 may identify a soft connection between the needy user and the page associated with the business, if the needy user visits the page associated with the business more than a threshold number of times. In another example, if a needy user browses through the timeline of a page, hereinforces a soft connection between the page and the needy user. Similar to above, the social networking system 140 may identify a soft connection between the needy user and the page if the needy user browses the page more than a threshold number of times, or spends more than a threshold amount of time browsing the page.

In another embodiment, multiple implicit interactions between the needy user and content items associated with an object of the social networking system 140, results in the social networking system 140 identifying a soft connection between the user and the object of the social networking system 140. For example, if a user "likes" content on a page or posts on a page, replies to a comment on a page, or otherwise interacts with a page without explicitly establishing a connection with the page, such as "fanning," or "liking" the page, the social networking system 140 identifies a soft connection between the needy user and the page.

In another embodiment, third party systems 130 provide information associated with a user's interaction on content presented to the user via the third party systems 130, to the social networking system 140, via a web page plugin for example. Based on the interaction information provided by the third party systems 130, the social networking system 140 identifies soft connections between the user and the content presented to the user on the third party systems. For example, authors and businesses may provide content that is available to be fanned by users of the social networking system 140 through a web page including a plugin associated with the social networking system 140. When a user visits the web page, the plugin is configured to send information to the social networking system 140 identifying the implicit interactions between the user and the author or business. The social networking system 140 may identify a soft connection between the user and the author or business on identifying more than a threshold number of implicit interactions between the user and the author or business.

In one embodiment, the social networking system 140 monitors implicit interactions between a user and a topic, and identifies from the implicit interactions a soft connection between the user and the topic. Topics are object that have been tagged with ontological meaning. For instance, pages that are related to Wikipedia entities are topics. More generally topic objects can refer to single entities such as concepts (e.g., philosophical concepts or arguments), activities (e.g., hiking, skiing or swimming), or public entities (e.g., sport clubs, celebrities, politicians, etc.). In one embodiment, the social networking system 140 maintains a relationship between objects of the social networking system 140 and topics. For example, the social networking system 140 may use meta-page clustering to cluster objects of the social networking system 140 around a specific topic, thereby maintaining a relationship between the objects of the social networking system 140 and the specific topic. For instance, equivalent concepts expressed across multiple pages may be matched and associated with a meta page or a topic as further described in U.S. patent application Ser. No. 13/295,002 filed on Nov. 11, 2011, and in U.S. patent application Ser. No. 13/295,001 filed on Nov. 11, 2011, each of which is hereby incorporated by reference in its entirety.

In another example, the social networking system 140 may apply topic tagging processes to maintain a relationship between objects and topics. For example, the social networking system maintains a relationship between an object and a topic based on the semantic content of a content item, such as a post, a message or a comment, associated with an object of the social networking system 140. In another example, relationships between objects may be formed, and objects can be grouped and connected based on similar categories or topics identified in the pages as further described in U.S. patent application Ser. No. 13/312,912 filed on Dec. 6, 2011, which is hereby incorporated by reference in its entirety.

The social networking system 140 may identify implicit interactions between a user and a topic. For example, when a user produces content (e.g., posts a comment) associated with a topic, or when a user interacts with, or searches for a tag identifying a text. The social networking system 140 may identify objects associated with the topics with which the user has implicit interactions and may identify one or more of the objects as objects with which the user has a soft connection. For example, when a user produces text content associated with a topic, the social networking system may identify the meta page of the cluster associated with the topic as an object with which the user has a soft connection. The social networking system 140 may store an identifier in the edge store identifying a soft connection between the needy user and an object with which the user has a soft connection.

The social networking system 140 generates 420 a candidate list including one or more of the objects with soft connections to the user to recommend to the user. In one embodiment, the social networking system 140 prunes the identified soft connections such that only important soft connections (identifying objects) are recommended to the user and less relevant soft connections are ignored (e.g. needy user accidentally visiting a page resulting in the system identifying a soft connection between the user and the page). Examples, of less relevant soft connections include soft connections that may be transient, soft connections that are not predictive of the user establishing an explicit connection with the objects identified by the soft connections, or soft connections with which a user has a strong and lasting interaction history.

The social networking system 140 uses a number of processes to determine which soft connections are suitable to recommend to a user. These processes aim at detecting strong soft connections to add to a candidate list of soft connections to recommend to the user and filter out weak soft connections. In one embodiment, the social networking system 140 identifies soft connections to include in a candidate list of soft connections to recommend to the user based on the graph distance between the objects identified by the soft connections associated with a needy user and objects with which the user has established a connection. For example, the social networking system 140 identifies the graph distance between a page identified as a soft connection to a needy user, and friends (other users with whom the user has established a connection) of the user. If the graph distance is less than a threshold value, the social networking system 140 identifies the page with which the user has a soft connection as an object to include in the candidate list of soft connections to recommend to the user. In one example, the graph distance can be weighted by the weight based on the type of object (e.g., page, another user, etc.) with which the user has established a connection or the type of object associated with the soft connection.

In another embodiment, the social networking system 140 may use and/or train a model to identify soft connections to include in a candidate list of soft connections to recommend to the user. For example, the social networking system 140 collects features of interactions between the user and one or more objects identified as soft connections to the user, such as frequency of interactions between the user and the object, a regional importance associated with the object, or the topics associated with the object, and trains a model to identify soft connections to recommend to the user as part of a candidate list of soft connections.

In yet another embodiment, the social networking system 140 aggregates the most frequently interacted with soft connections over a time window, weights certain types of soft connections greater than others, and selects the top soft connections to include in a candidate list of soft connections to recommend to the needy user. For example, the top 100 soft connections can be aggregated over the past month and actions such as searching for an object can be given a higher weight than visiting an object. The weights may be determined empirically or through a trained model.

In another example, the social networking system 140 identifies topics or objects associated with topics that have only a transient soft connection with a user, and removes the transient soft connections from the candidate list of soft connections to recommend to the user. A transient soft connection is a soft connection that was accidentally identified by the social networking system, such as when a user accidentally visits a page, or a soft connection a user is visiting for the moment but may not be interested in interacting with or establishing a connection with the object in the future, such as a trending topic the user views but is not interested in viewing or interacting with in the future. In one example, the social networking system 140 identifies objects associated with the identified soft connections which have more than a threshold number of users explicitly connected to the object as an object or soft connection to recommend to the user. In another example, the social networking system 140 identifies soft connections with which the needy user has interacted with less than a threshold number of times, or for less than a threshold time interval as transient soft connections to not recommend to the user.

In one embodiment, the social networking system 140 may expand 425 the candidate list of soft connections to recommend to the user based on the soft connections identified by the social networking system or based on the soft connections included in the candidate list of soft connections. Similar to the process of identifying soft connections to recommend to the needy user, the candidate list of soft connections can be expanded upon to include objects similar to objects with which the needy user has a soft connection. In one example, the social networking system 140 identifies objects connected to a topic connected to a soft connection selected to be recommended to the needy user. The social networking system 140 may identify objects with greater than a threshold number of users explicitly connected to the object, or objects with less than a threshold graph distance from objects with which the needy user has established a connection, as objects to include in the expanded list of candidate soft connections to recommend to the needy user.

The social networking system 140 may extract 430 signals from the identified soft connections or the soft connections in the candidate list to recommend to the needy user. Examples of signals include, but are not limited to, time since the last interaction between the needy user and the object associated with a candidate soft connection, frequency at which the user has interacted with the same soft connections over a threshold period of time (e.g., last ten days), or the total number of types of actions performed by a user with respect to a given soft connection or object associated with the soft connection.

Based on the extracted signals, the social networking system 140 may rank 435 the soft connections in the candidate list of soft connections to recommend to the user. For example, the soft connections or objects in the candidate list of soft connections to recommend to the user may be ranked based on the number of times the user has interacted with the objects over a threshold period of time. In another example, the social networking system 140 may incorporate the signals into a ranking model to predict the user's affinity towards the soft connection candidates. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety.

The social networking system 140 selects 440 soft connections from the candidate list of soft connections to provide to the user. In one embodiment, the social networking system 140 selects soft connections or objects in the candidate list based on the rank associated with the soft connections or objects. For example, the social networking system 140 selects 440 the top 20 ranked soft connections to recommend to the user.

The selected soft connections to recommend to a needy user can then be presented for display to the needy user in the social networking system 140. In one embodiment, the system 140 selects the highest ranked objects from the candidate list of soft connections or objects (e.g., the top 20 or top 50). The social networking system 140 might provide a newsfeed to the user and somewhere on the page that includes the news feed (e.g., in a side margin), the system can provide a list of recommended objects for the user. For example, the user's newsfeed page in the social networking system 140 might include a "Pages you Might Like" section in a margin along the side of the page or as a newsfeed item within the news feed. This recommendations section can provide a list of all of the selected objects or pages, or a top few pages. In addition, the social networking system 140 might show a first few of the recommended objects, and then when the user refreshes the page or navigates to a new page, the system 140 might show the next few of the recommended objects. If the social networking system 140 has identified 50 total recommended objects for the user, the system 140 can continue to cycle through this list until all recommendations have been provided. The system 140 can also occasionally re-determine the top objects if a certain amount of time has passed or it is determined that a new ranking should be performed to get a new set of recommended objects.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining, by an online system, implicit interactions between a user and one or more objects maintained by the online system, where an implicit interaction is an interaction performed by the user with an object with which the user has not established a connection;
   determining one or more soft connections between the user and a plurality of objects to recommend to the user, each soft connection corresponding to one or more implicit interactions performed by the user with an object of the plurality of objects;
   identifying an additional object to recommend to the user based on a similarity between the additional object and objects of the one or more soft connections; and
   selecting at least one of the plurality objects associated with the one or more soft connections and the additional object for recommendation to the user to establish an explicit connection.

2. The method of claim 1, further comprising:
   determining, by the online system, at least one of a number of the obtained implicit interactions, explicit interactions, or explicit connections associated with the user, each explicit interaction being an interaction between the needy user and an object maintained by the online system with which the user has established a connection, and
   wherein the at least one of the plurality objects associated with the one or more soft connections and the additional object are selected for recommendation to the user to establish an explicit connection responsive to the at least one of the determined number of the obtained implicit interactions, the explicit interactions, or the explicit connections being below a threshold number.

3. The method of claim 2, further comprising:
   identifying the user as a needy user based on the determined number of the obtained implicit interactions, the explicit interactions, or the explicit connections being below the threshold number.

4. The method of claim 1, wherein determining the one or more soft connections between the user and the plurality of objects includes:
   identifying an implicit interaction between the user and a topic associated with a first object corresponding to the implicit interaction;
   identifying a second object associated with the topic from a cluster of pages associated with the topic; and
   identifying a soft connection between the user and the second object associated with the topic.

5. The method of claim 1, wherein determining the one or more soft connections between the user and the plurality of objects includes:

identifying a graph distance between a first object identified by a soft connection in the set of soft connections and an object with which the user has established a connection; and including the soft connection in a candidate list of soft connections responsive to the graph distance being less than a threshold value, wherein the at least one of the plurality objects associated with the one or more soft connections and the additional object are selected for recommendation to the user from the candidate list of soft connections.

6. The method of claim 5, wherein the graph distance is weighted based on the type of object with which the user has established a connection or the type of object identified as a soft connection to the user.

7. The method of claim 5, wherein identifying the additional object to recommend to the user based on the similarity between the additional object and objects of the one or more soft connections includes:

identifying objects connected to a topic associated with an object identified by a soft connection; and including the identified objects, as soft connections, in the candidate list of soft connections to recommend to the user.

8. The method of claim 5, wherein identifying the additional object to recommend to the user based on the similarity between the additional object and objects of the one or more soft connections includes:

identifying soft connections associated with objects with which the user has interacted with for greater than a threshold time interval; and including the identified soft connections in the candidate list of soft connections.

9. A computer-implemented method comprising:

obtaining, by an online system, implicit interactions between a user and one or more objects maintained by the online system, an implicit interaction is an interaction performed by the user with an object with which the user has not established a connection;

determining one or more soft connections between the user and a plurality of objects to recommend to the user, each soft connection corresponding to one or more implicit interactions performed by the user with an object of the plurality of objects;

identifying an additional object to recommend to the user based on a similarity between the additional object and objects of the one or more soft connections;

ranking the plurality of objects and the identified additional object into a ranked list of object to recommend to the user to establish an explicit connection based on ranking signals associated with each of the plurality of objects and the identified additional object; and selecting at least one of the plurality of objects associated with the one or more soft connections and the additional object from the ranked list to recommend to the user.

10. The computer-implemented method of claim 9, wherein the ranking signals include at least one of a time since a last interaction between the user and an object associated with a soft connection, a frequency of interaction between the user and a soft connection over a threshold period of time, or a total number of interaction types of associated with interactions between the user and a soft connection.

11. The computer program product of claim 9, wherein determining one or more soft connections between the user and a plurality of objects to recommend to the user comprises:

identifying a soft connection between an object and the user upon identifying more than a threshold number of implicit interactions between the user and the object.

12. The computer program product of claim 9, wherein determining one or more soft connections between the user and a plurality of objects to recommend to the user comprises:

identifying a soft connection between an object and the user based on an implicit interaction between the user and content associated with the object.

13. The computer-implemented method of claim 9, further comprising:

determining, by the online system, at least one of a number of the obtained implicit interactions, explicit interactions, or explicit connections associated with the user, each explicit interaction being an interaction between the needy user and an object maintained by the online system with which the user has established a connection, and wherein the at least one of the plurality objects associated with the one or more soft connections and the additional object are selected for recommendation to the user to establish an explicit connection responsive to the at least one of the determined number of the obtained implicit interactions, the explicit interactions, or the explicit connections being below a threshold number.

14. A non-transitory computer readable storage medium storing one or more programs, the one or more programs comprising instructions that, when executed by a processor, cause the processor to:

obtain implicit interactions between a user and one or more objects maintained by an online system, an implicit interaction is an interaction performed by the user with an object with which the user has not established a connection;

determine one or more soft connections between the user and a plurality of objects to recommend to the user, each soft connection corresponding to one or more implicit interactions performed by the user with an object of the plurality of objects;

identify an additional object to recommend to the user based on a similarity between the additional object and objects of the one or more soft connections; and select at least one of the plurality objects associated with the one or more soft connections and the additional object for recommendation to the user to establish an explicit connection.

15. The non-transitory computer readable storage medium of claim 14, wherein the instructions that, when executed by the processor, further cause the processor to:

determine at least one of a number of the obtained implicit interactions, explicit interactions, or explicit connections associated with the user, each explicit interaction being an interaction between the needy user and an object maintained by the online system with which the user has established a connection, and wherein the at least one of the plurality objects associated with the one or more soft connections and the additional object are selected for recommendation to the user to establish an explicit connection responsive to the at least one of the determined number of the obtained implicit interactions, the explicit interactions, or the explicit connections being below a threshold number.

16. The non-transitory computer readable storage medium of claim 14, wherein determining the one or more soft connections between the user and the plurality of objects includes:
    identifying an implicit interaction between the user and a topic associated with a first object corresponding to the implicit interaction;
    identifying a second object associated with the topic from a cluster of pages associated with the topic; and
    identifying a soft connection between the user and the second object associated with the topic.

17. The non-transitory computer readable storage medium of claim 14, wherein determining the one or more soft connections between the user and the plurality of objects includes:
    identifying a graph distance between a first object identified by a soft connection in the set of soft connections and an object with which the user has established a connection; and
    including the soft connection in a candidate list of soft connections responsive to the graph distance being less than a threshold value, wherein the at least one of the plurality objects associated with the one or more soft connections and the additional object are selected for recommendation to the user from the candidate list of soft connections.

18. The non-transitory computer readable storage medium of claim 17, wherein the graph distance is weighted based on the type of object with which the user has established a connection or the type of object identified as a soft connection to the user.

19. The non-transitory computer readable storage medium of claim 14, wherein determining the one or more soft connections between the user and the plurality of objects includes:
    identifying a graph distance between a first object identified by a soft connection in the set of soft connections and an object with which the user has established a connection; and
    including the soft connection in a candidate list of soft connections responsive to the graph distance being less than a threshold value, wherein the at least one of the plurality objects associated with the one or more soft connections and the additional object are selected for recommendation to the user from the candidate list of soft connections.

20. The non-transitory computer readable storage medium of claim 19, wherein identifying the additional object to recommend to the user based on the similarity between the additional object and objects of the one or more soft connections includes:
    identifying at least one of objects connected to a topic associated with an object identified by a soft connection or soft connections associated with objects with which the user has interacted with for greater than a threshold time interval; and
    including the identified objects, as soft connections, in the candidate list of soft connections to recommend to the user.

* * * * *